March 7, 1967 S. DARDARIAN 3,308,299

PHOTOELECTRIC SUN SENSOR DEVICE INCLUDING AN OSCILLATING DISC WITH A PLURALITY OF APERTURES THEREIN

Filed April 30, 1963 7 Sheets-Sheet 1

INVENTOR.
SAHAG DARDARIAN
BY [signature]
ATTORNEY

March 7, 1967 S. DARDARIAN 3,308,299

PHOTOELECTRIC SUN SENSOR DEVICE INCLUDING AN OSCILLATING DISC WITH A PLURALITY OF APERTURES THEREIN

Filed April 30, 1963 7 Sheets-Sheet 2

INVENTOR.
SAHAG DARDARIAN
BY Herbert L. Davis
ATTORNEY

INVENTOR
SAHAG DARDARIAN
BY Herbert L. Davis
ATTORNEY

INVENTOR.
SAHAG DARDARIAN
BY Herbert L. Davis
ATTORNEY

INVENTOR.
SAHAG DARDARIAN
BY Herbert L. Davis
ATTORNEY

March 7, 1967 S. DARDARIAN 3,308,299

PHOTOELECTRIC SUN SENSOR DEVICE INCLUDING AN OSCILLATING DISC WITH A PLURALITY OF APERTURES THEREIN

Filed April 30, 1963 7 Sheets-Sheet 6

INVENTOR
SAHAG DARDARIAN
BY Herbert L. Davis
ATTORNEY

March 7, 1967 S. DARDARIAN 3,308,299

PHOTOELECTRIC SUN SENSOR DEVICE INCLUDING AN OSCILLATING DISC WITH A PLURALITY OF APERTURES THEREIN

Filed April 30, 1963 7 Sheets-Sheet 7

INVENTOR.
SAHAG DARDARIAN
BY Herbert L. Davis
ATTORNEY 3,308,299

PHOTOELECTRIC SUN SENSOR DEVICE INCLUDING AN OSCILLATING DISC WITH A PLURALITY OF APERTURES THEREIN

Sahag Dardarian, Ridgefield, N.J., assignor to The Bendix Corporation, Teterboro, N.J., a corporation of Delaware Filed Apr. 30, 1963, Ser. No. 276,912
5 Claims. (Cl. 250—203)

The invention relates to a fine sun sensor device and more particularly to such a device capable of indicating the center of the sun to 1.0 second of arc, utilizing novel means to attain and maintain its accuracy.

An object of the invention is to provide a sun sensor device embodying inherent characteristics which allow for changes in the sun's distance and for aging of the photosensors without affecting accuracy.

Another object of the invention is to provide a fine sun sensor device including a body mounted so as to detect along two axes, pitch and yaw, or zenith and azimuth, and in which the operation along each axis is the same, each axis producing two electrical pulses which, through phase displacement, may be used to determine deviation error in the zenith and azimuth axis of the sun relative to the axis of the sun sensor device.

Another object of the invention is to provide a fine sun sensor device including a mechanical subsection in which four lenses or suitable light passage means spaced ninety degrees (90°) apart are carried on the periphery of a thin opaque disc suspended on a torsion wire, the device includes suitable motor means for effecting the desired oscillation of the disc, and in which arrangement, there is further provided in spaced relation to the disc and in the focal plane of the lenses four phototransistors mounted behind slit-shaped apertures, the arrangement being such that the light rays from the sun may impinge upon the lenses in the thin oscillating disc, and as the disc oscillates the lenses move, the four images oscillate in the focal plane, each crossing a slit-shaped aperture and a phototransistor to produce four electrical outputs, two for each axis, zenith and azimuth and there being further included means utilizing each pair of output through phase displacement, to determine the deviation error for a particular axis of the sun relative to the axis of the sun sensor device.

Another object of the invention is to provide a sun sensor device of extreme accuracy to provide error signals to an outer space operated vehicle which will indicate the apparent center of the sun to within ±1.0 second of arc.

Another object of the invention is to provide a sun sensor device so arranged that cross coupling between horizontal and vertical channels which may otherwise cause inaccuracy in the operation of the device may be eliminated.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figures 1, 2:
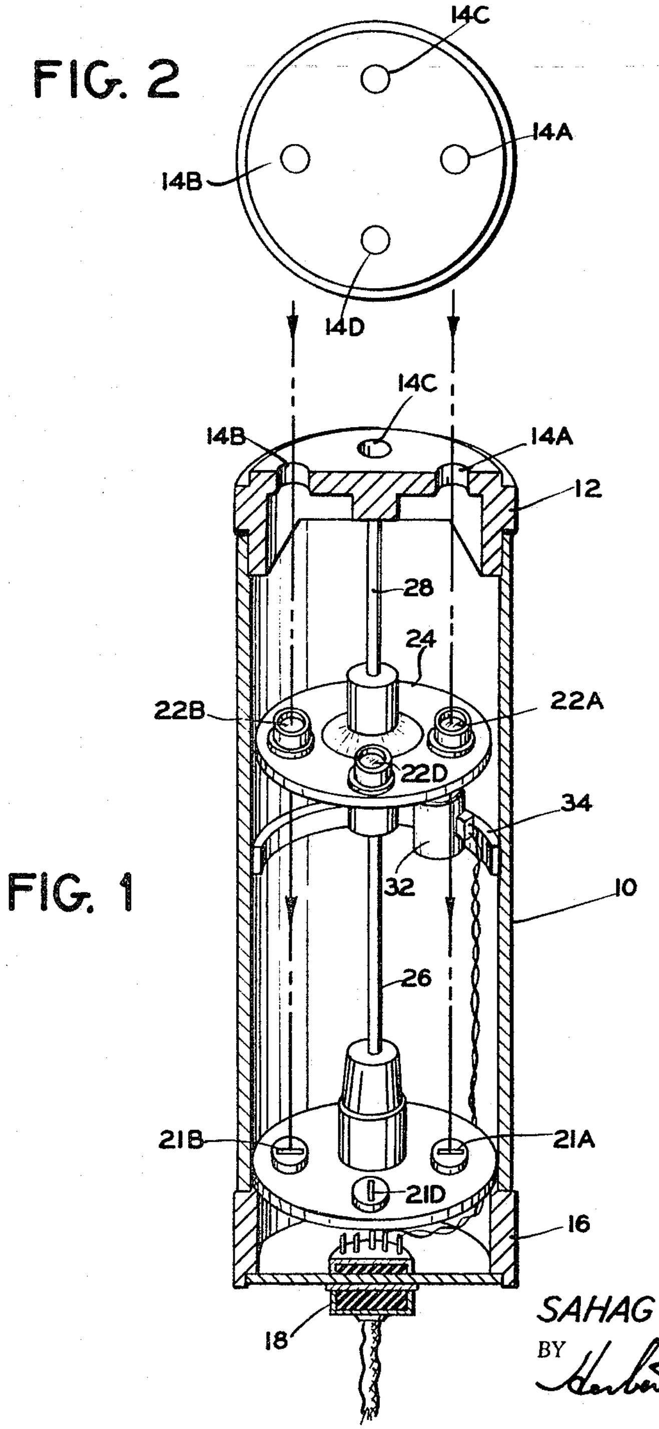
FIGURE 1 is a perspective sectional assembly view of a sun sensor device embodying the invention.
FIGURE 2 is an end view of FIGURE 1.
Figure 10:
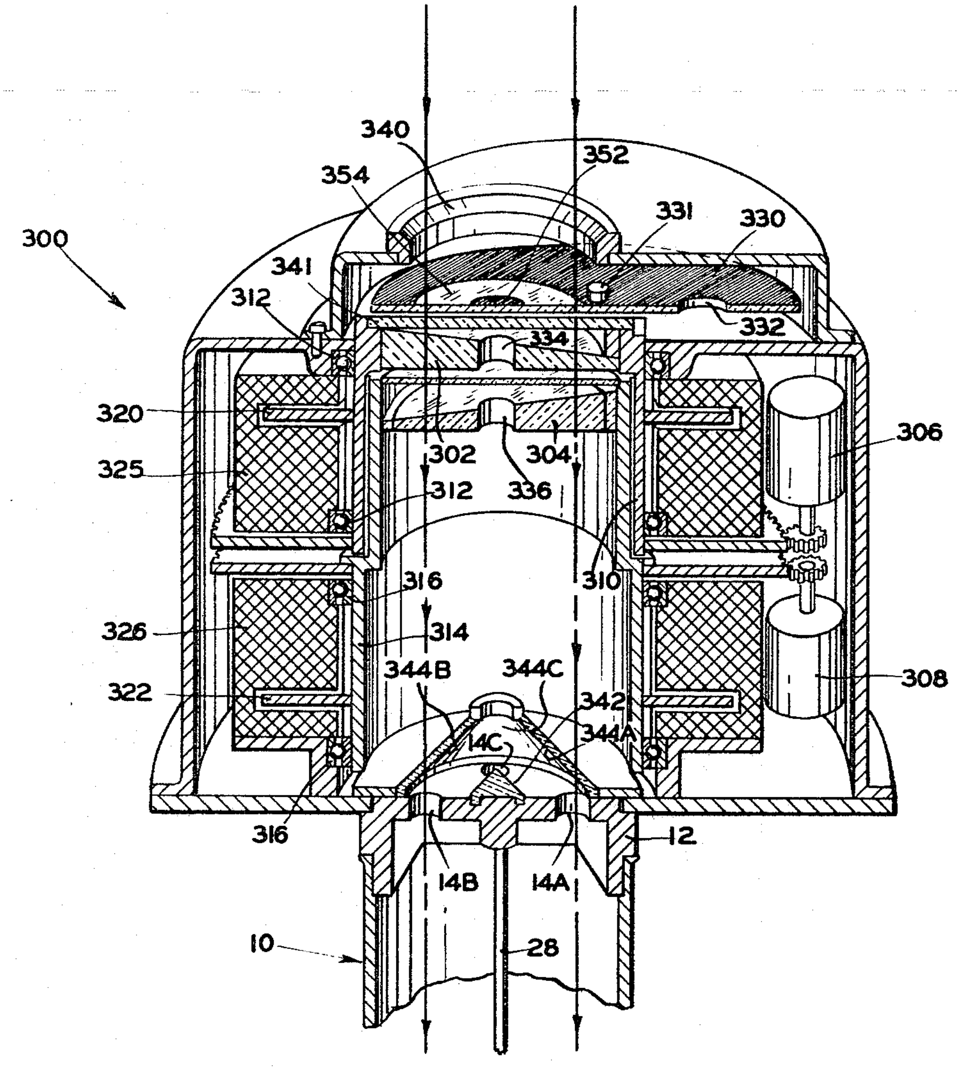
FIGURE 10 is a sectional assembly view of an off-axis adapter for use with the sun sensor device of FIGURE 1.

Referring to the drawing of FIGURE 1, the fine sun sensor device is shown as including a cylindrical casing 10 capped at an upper end by a cap 12 (capable of accepting an off-axis adapter, such as shown at FIGURE 10). The cap 12 may be pierced by four apertures 14A, 14B, 14C, and 14D, as shown in FIGURES 1, 2, and 3 to admit incident light rays.

The lower end of the cylindrical casing 10 is capped at 16 to accept vehicle frame mounting and provide electrical access to the electrical outputs from the sun sensor device through a suitable connector plug 18.

Figure 3:
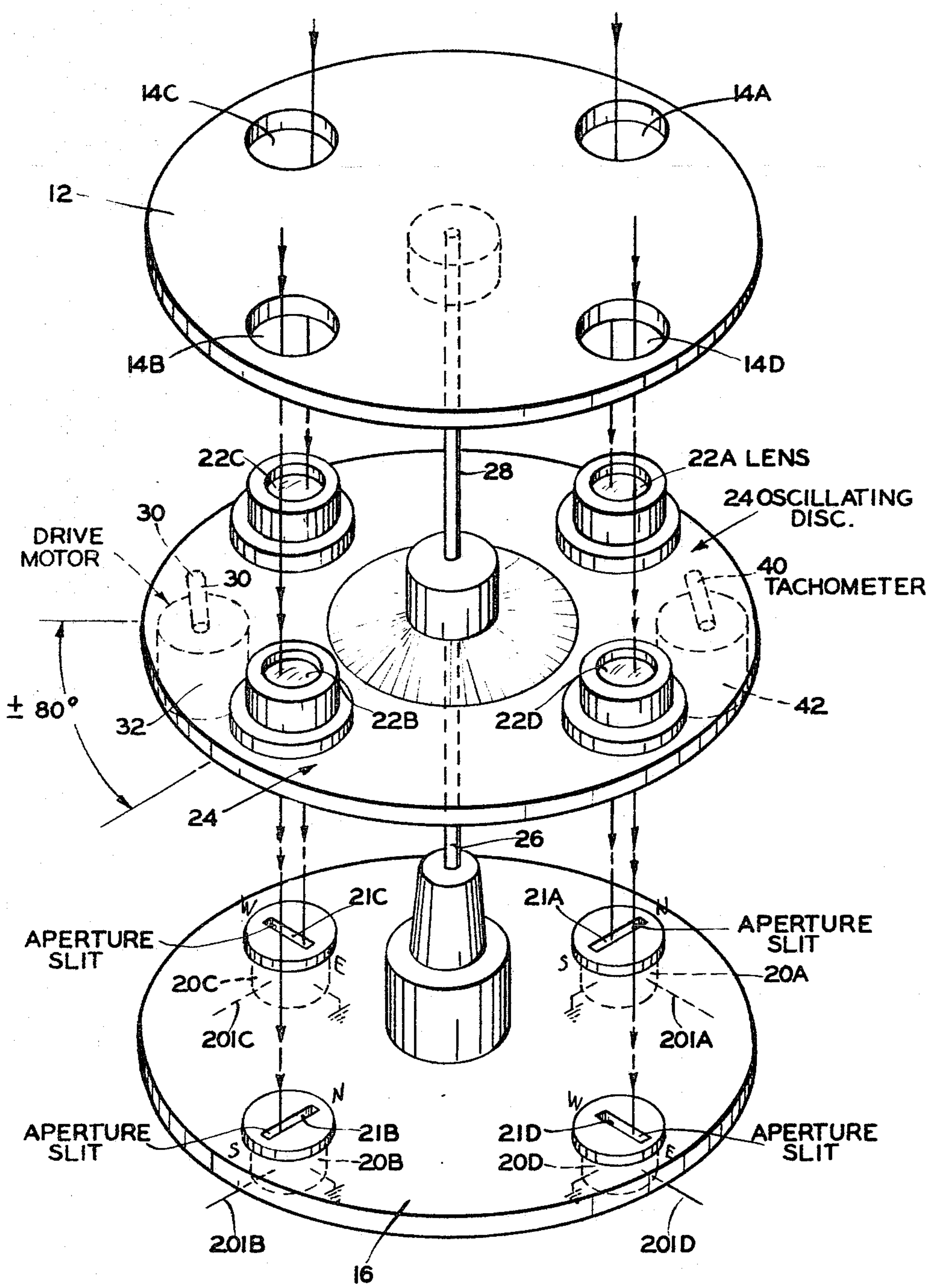
FIGURE 3 is an exploded perspective schematic view illustrating the operation of certain parts of the structure of FIGURE 1.

Within the lower cap 16 are mounted photodetectors or transistors 20A–20D shown in FIGURE 3 which respond to light or sun rays impinging thereon through slit-like apertures 21A–21D upon an image of the sun being projected thereacross through suitable light passage means such as lenses 22A–22D borne by an opaque disc 24 in cooperative relation with the four apertures 14A-14D shown in FIGURES 2 and 3. Further, the disc 24 is coaxially mounted by torsion members 26 and 28 arranged to pivotally support the disc 24 for oscillatory movement. Electromechanical oscillation of the disc 24 may be effected by suitable motor means.

Figure 4:
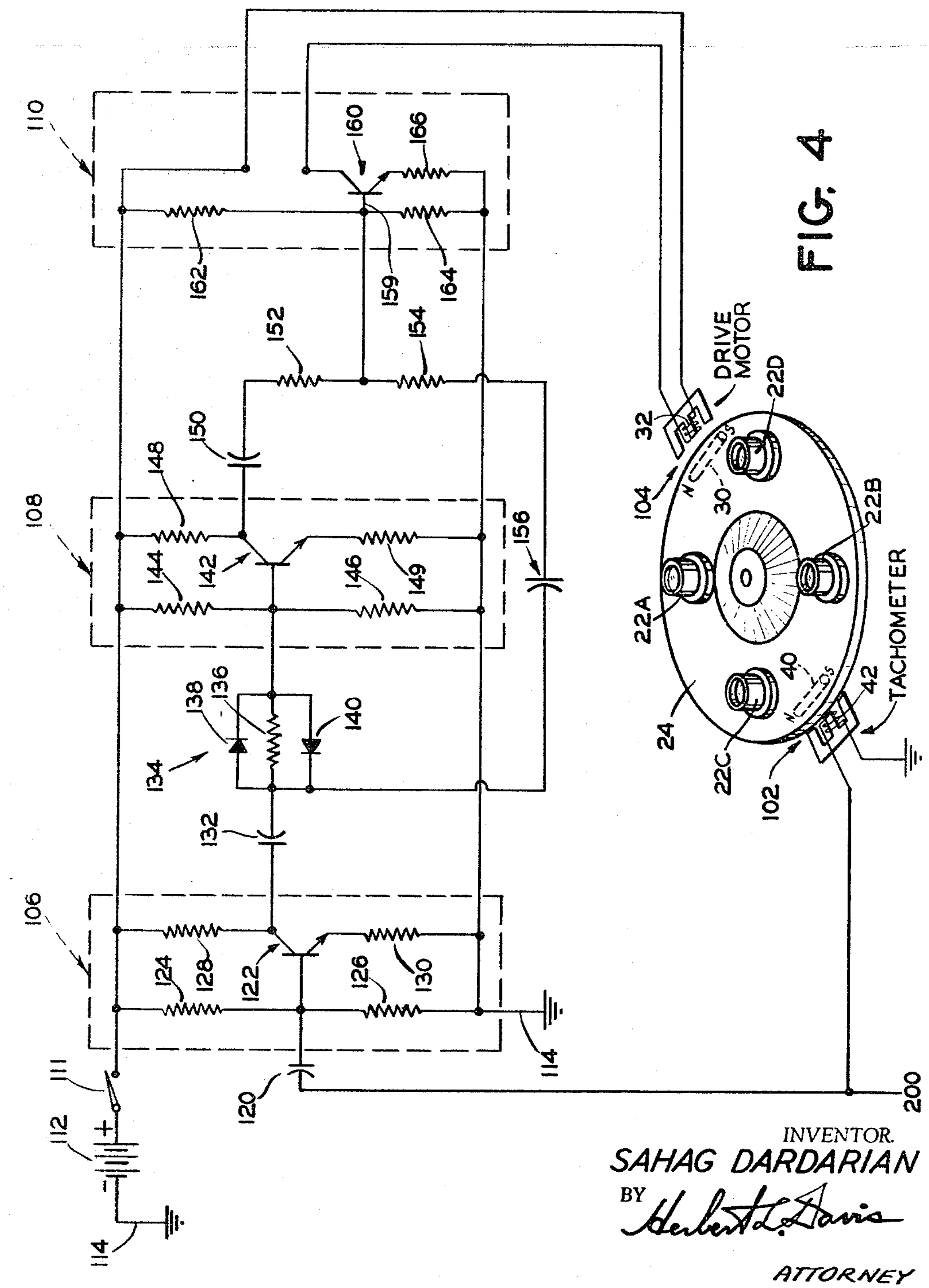
FIGURE 4 is a wiring diagram of an electrical control circuit for the oscillator disc of FIGURES 1 and 3.
Figure 9:
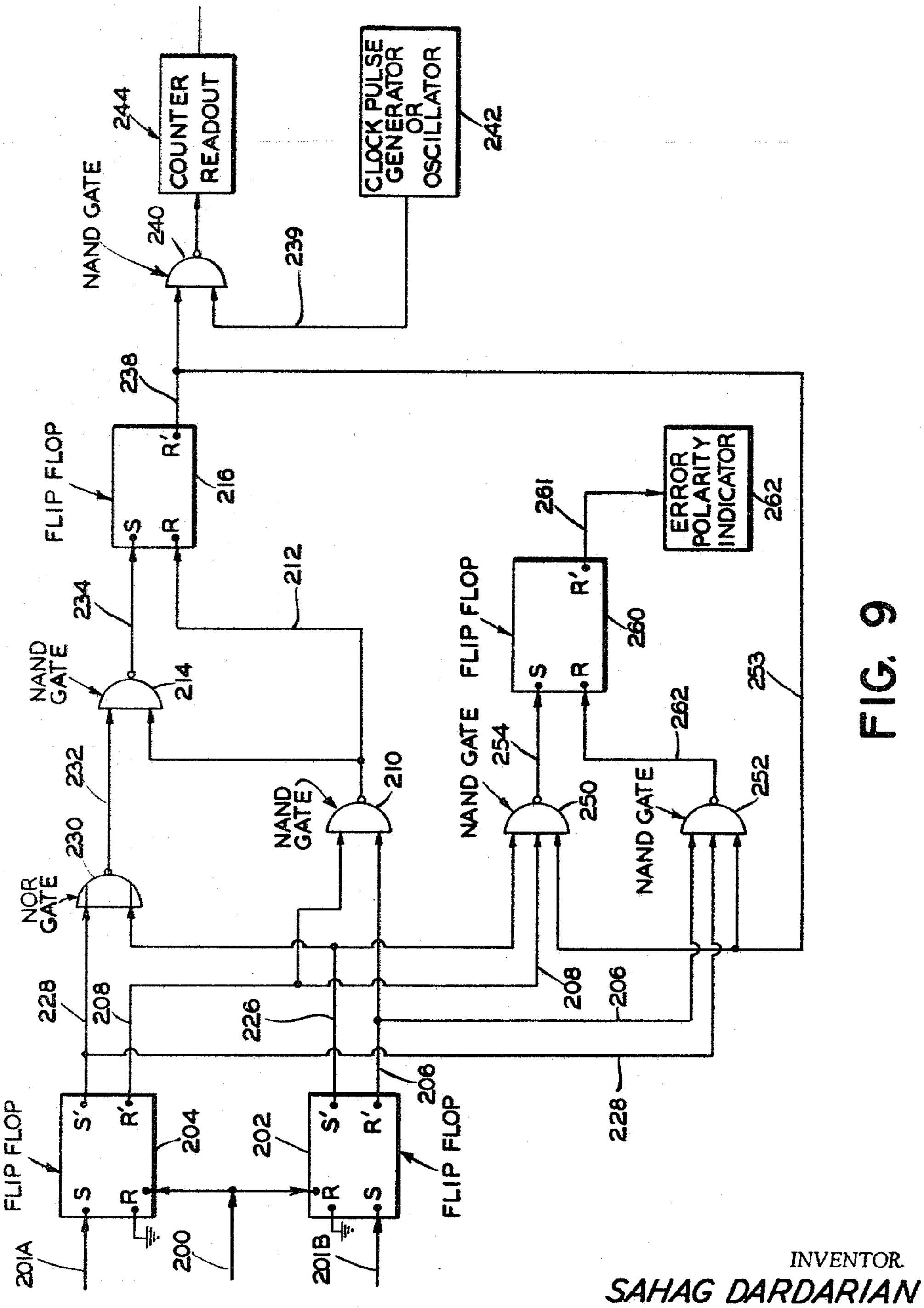
FIGURE 9 is a block diagram showing schematically the sun sensor error readout control circuit.

The provision, however, of a motor and tachometer means in cooperative relation with the oscillator disc 24, and the oscillation control circuit of FIGURE 4 to effect a constant amplitude of oscillation of the disc 24 as well as the generation of a constant frequency "arm" pulse for controlling the operation of the error readout counter of FIGURE 9 forms the subject matter of a copending U.S. application Serial No. 276,927, filed April 30, 1963 by Frederick Rawls, Michael T. Krivak, and Sahag Dardarian, and assigned to The Bendix Corporation, assignee of the present invention.

Referring to the drawings of FIGURES 1, 3, and 4, beneath the oscillatory disc 24 and fastened to the underside thereof is a permanent bar magnet 30 which may be angularly actuated by electromagnetic forces effected upon periodic energization of a motor or driving coil 32 supported by a bracket fixedly secured to the inner surface of the cylindrical casing 10, as shown in FIGURE 1.

Further, there is an identical permanent bar magnet 40 mounted on the underside of the oscillatory disc 24, as shown in FIGURE 3, and cooperating with an induction coil 42 located one hundred and eighty degrees (180°) about the inner periphery of the cylindrical casing 10 from the driving or motor coil 32 and carried on the same supporting ring 34. This latter induction coil 42 serves as a tachometer or velocity feedback in the control circuit for the motor coil 32 of the disc assembly, as shown schematically in FIGURE 4.

Upon the operator closing a switch 111 turning on a source of excitation power 112, an electrical pulse is applied to the drive coil 32 which in turn serves to actuate the disc 24 into sustained oscillation. The tachometer coil 42 may have induced therein upon movement of the disc 24 and bar magnet 40 relative thereto an electrical force which is in turn applied as a positive feedback current pulse through the oscillation control circuit of FIGURE 4 to further energize the drive motor coil 32 until an oscillation of the disc 24 is obtained, which in turn induces in the tachometer coil 42 a pulsating alternating current, the frequency of which is determined by the moment of inertia of the disc assembly 24 and the spring constants of the torsion members 26 and 28.

OSCILLATION CONTROL CIRCUIT

Referring to FIGURE 4, there is shown therein a schematic drawing of the oscillation control circuit having an input from a tachometer 102 including the bar magnet 40 and coil 42 providing an output to a motor drive 104 including the bar magnet 30 and driving coil 32. The control circuit includes three stages of amplification 106, 108, and 110, each of conventional design. The three-stage amplifier is powered by the source of potential 112 referenced to ground potential 114.

The pulsating alternating current signal from tachometer 102 is applied through a coupling capacitor 120 to the first stage 106 which comprises a transistor 122, biasing resistors 124 and 126, a load resistor 128, and an emitter resistor 130. The first stage is a conventional gain stage and need not be further discussed here. For those who may care to trace the exact operation and structure of the circuit, values of the components used in the circuit are set forth hereinafter by way of example.

First stage 106 is capacitively coupled by capacitor 132 to second stage amplifier 108. At the input to the second-stage amplifier 108, there is a diode limiter 134 made up of a resistor 136 paralleled with a forward biased diode 138 and a reverse biased diode 140. The diodes behave as virtual shorts for all such pulsating alternating current signals having an amplitude greater than, for example, 0.6 volt, and thus provides a closed loop for the alternating current signal pulses which serves to effectively limit the amplitude of the incoming signal which may be applied through resistor 136 to a value not greater than said critical value of, for example, 0.6 volt.

The second-stage amplifier 108 also includes a transistor 142 having its base connected to receive the limited signal from the limiter 134, and a pair of resistors 144 and 146 for biasing the transistor 142. The resistor 146 also, in conjunction with the limiter 134, provides a divider circuit limiting the input signal.

Also, in the second-stage amplifier 108, a load resistor 148 connects a collector of the transistor 142 to source of potential 112, and an emitter resistor 149 connects an emitter of transistor 142 to ground potential 114. An output from transistor 142 is capacitively coupled through a capacitor 150, and a resistor 152, to a negative feedback loop made up of a resistor 154 and a capacitor 156 which brings an output signal from transistor 142 back to the input of the second-stage amplifier 108 at the junction of the coupling capacitor 132 and the diode limiter 134.

The level of signal input and feedback signal determines the amplitude of the disc oscillation.

The nature of the feedback provided through the resistor 154 and the capacitor 156 is negative. Thus for a very small input signal from the first stage, the third stage rapidly drives the disc 24 to a maximum amplitude consistent with the limiting action of limiter 134 and maintains a constant amplitude output signal thereafter.

The third and last stage amplifier 110 is a conventional power amplifier stage. Its input is received from the previous stage, directly at a base 159 of a transistor 160, which is biased by a pair of resistors 162 and 164. It should be noted that the capacitors 150 and 156 in the previous stage block any D.C. component of the power supply 112, from entering and interfering with the bias of the third-stage amplifier 110. An emitter resistor 166 connects an emitter of transistor 160 to ground potential 114. A load on this third-stage amplifier 110 is the motor drive 104 which has its drive coil 32 connected between a collector of transistor 160 and the source of potential 112.

In summary, the oscillation control circuit, as shown in FIGURE 4, provides a constant amplitude driving signal to motor drive 104. The frequency of this signal is tied to the frequency of oscillation of the disc 24. Thus, in addition to constant amplitude, there is provided a frequency interlock between the actual oscillations of the disc 24 as sensed by the tachometer 102 and the motor 104 which drives the disc 24.

There are many different values of circuit parameters for which the oscillation control circuit shown in FIGURE 4 will function satisfactorily. Since the circuit parameters may vary according to the design for any particular application, the following circuit parameters are included for the circuit of FIGURE 4 by way of example only.

Capacitors 120, 132, 150, and 156: 22 microfarads, 35 volts

Resistors:
- 124—39 kilohms
- 136—12 kilohms
- 128—2 kilohms
- 130—510 ohms
- 136—41 kilohms Diodes 138 and 140—1N459

Resistors:
- 144—39 kilohms
- 146—7.5 kilohms
- 148—2 kilohms
- 149—200 kilohms
- 152—1 kilohm (value selected dependent upon desired amplitude of oscillation of the disc 24).
- 154—1 kilohm
- 162—6.2 kilohms
- 164—2.4 kilohms
- 166—130 ohms Transistors 122, 142, 160—2N760A Source of potential 112—16 volts

DETECTOR OUTPUT

Carried by the disc 24 are the four lenses 22A, 22B, 22C, and 22D positioned thereon ninety degrees (90°) apart and arranged in cooperative relation with the sun rays entering through corresponding apertures 14A, 14B, 14C, and 14D in the cap 12 as shown by FIGURES 1 and 3.

The four phototransistors 20A, 20B, 20C, and 20D, as shown in FIGURES 1 and 3, are accurately positioned in the end cap 16 behind aperture slits 21A, 21B, 21C, and 21D lying in the focal plane of the oscillating lenses 22A, 22B, 22C, and 22D. As the lenses 22A–22D move with the oscillation of the disc 24 effected by the oscillation control circuit of FIGURE 4, the sun image formed by them oscillates across the aperture slits 21A–21D.

Figure 5:
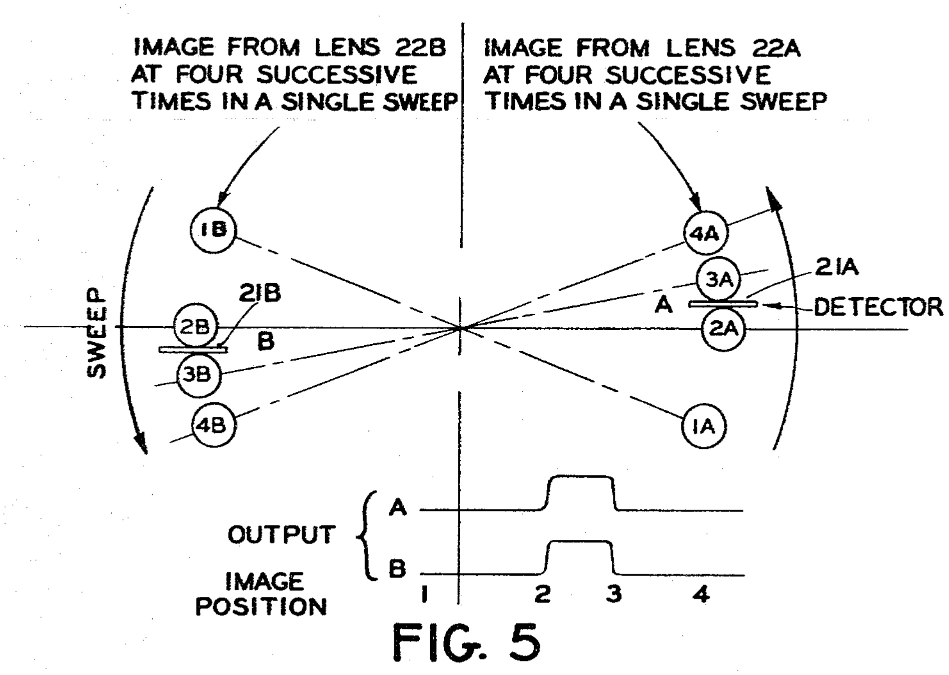
FIGURE 5 is a schematic illustration showing positions of the sun image relative to the indicated aperture slits and the outputs of the sensor device upon the sun image being "on axis" or in alignment with the normal operating axis of the device.
Figure 6:
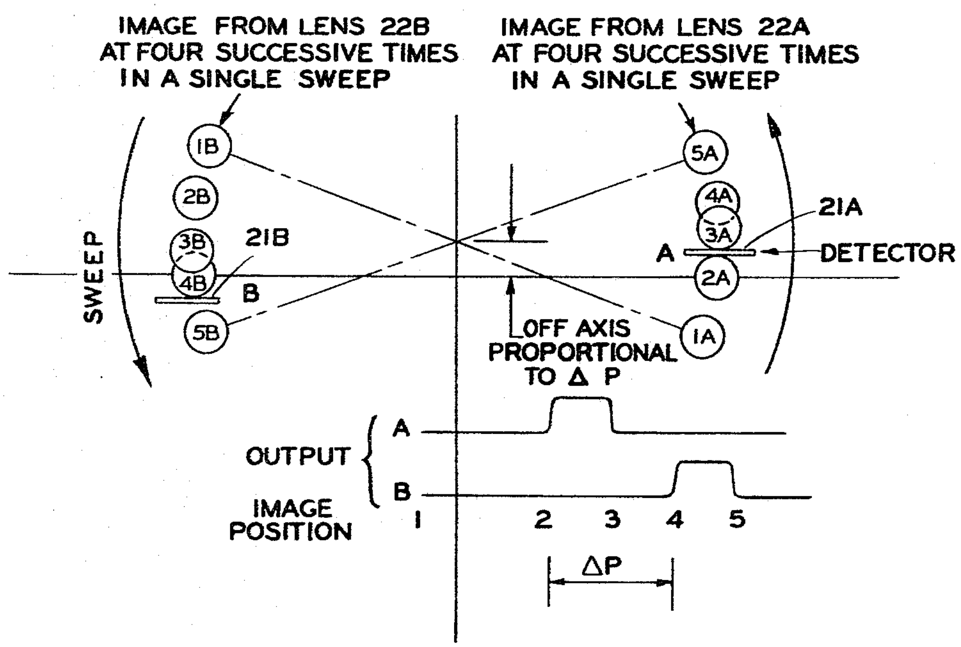
FIGURE 6 is a schematic illustration showing positions of the sun image relative to the indicated aperture slits and the outputs of the sensor device upon the sun immage being in an "off axis" condition or out of alignment with the normal operating axis of the device.

FIGURE 5 shows the relative position of the synchronized images of the sun and the output from the detectors or photosensors 20A and 20B if one axis of the detector axis is aligned with the incident light rays entering the upper cap 12. This corresponds to a "null" condition for the detector. FIGURE 6 depicts an "off-axis" or unaligned condition. It will be seen that displacement of the center of rotation of the images has occurred, constituting an error $\Delta P$.

In the drawings of FIGURES 5 and 6, the positions taken by the images of the sun effected by the lenses 22A and 22B in a single sweep of the disc 24 have been indicated by the numerals 1A to 5A and 1B to 5B, respectively. It will be seen that in comparing the several positions of the images shown in FIGURE 5 to that shown in FIGURE 6 that instead of image 2A crossing detector 21A simultaneously with image 2B crossing detector 21B, as in the aligned "null" condition of FIGURE 5, the image 2A of FIGURE 6 is crossing the detector 21A simultaneously with the image 4B crossing the detector 21B. Thus, the images are sensed only in the forward sweep of the scan of the disc 24, and the transition from dark to light occurring at the sun's horizon is used to produce output pulses which are coincidentally occurring in step relation for the "null" or "aligned" condition, shown graphically in FIGURE 5, while such output pulses are noncoincidentally occurring in and out-of-step relation for the "off-axis" or unaligned condition shown graphically in FIGURE 6.

Light from the sun passing directly through an aperture or through an off-set device impinges on the lens in the thin, oscillating disc. As the disc oscillates and the lenses move, the four images oscillate in the focal plane—each crossing a slit-shaped slot and a phototransistor to produce four electrical outputs—two for each axis, zenith and azimuth of the sun.

Since the lenses are physically located on one oscillating disc, the motions of the images are synchronized. Each pair of outputs is used through phase displacement to determine the deviation error for a particular axis of the sun relative to an axis of the sun sensor device.

Error readout is processed through associated electronics. An "arm" pulse is generated at the peak amplitude of the oscillating disc. This pulse acts as a synchronizing reference to maintain the proper sequence of succeeding operations. The output from each of the phototransistors 20A and 20B or 20C and 20D are applied to an associated error readout and control circuit which may be of the type shown in FIGURE 9.

The peaks of these voltages are maintained at a predetermined value, of for example 5 volts, even though the input intensity to the phototransistors varies from 1.02 to 0.98 times the normal value. These voltages are maintained by a gain-control circuit, not shown, and which may be of conventional type.

ERROR READOUT CONTROL CIRCUIT

Referring to FIGURE 9, there is shown therein a block diagram of an error readout control circuit for one of the two axes mentioned before and adapted to receive a synchronizing arm pulse on line 200; followed by two pulses A and B applied to lines 201A and 201B, the order of which may be reversed. The circuit represented in the FIGURE 9 measures the elapse time between the two pulses A and B, and indicates the order of pulses, i.e., which of the two pulses A or B is the first.

FIGURE 9 is related to the other figures of the drawing as follows: Arm pulse comes from an output conductor 200 of the tachometer 102, shown in FIGURE 4, while pulse A comes from an output conductor 201A of the phototransistor 20A and pulse B comes from an output conductor 201B of the phototransistor 20B, shown in FIGURE 3. The outputs 201A and 201B are applied through the error readout control circuit of FIGURE 9 so that through phase displacement, there may be determined the deviation error in an axis of the sun, for example, the azimuth axis relative to the axis of the sun sensor device.

The output conductor 200 from the tachometer 102 and output conductors 201C and 201D from the phototransistors 20C and 20D are similarly applied to an error readout control circuit such as shown in FIGURE 9 so that there may be determined through phase displacement the deviation error in the other axis of the sun, for example, the zenith axis relative to the axis of the sun sensor device.

The structure and the operation of the block diagram of FIGURE 9 may be traced together. The arm pulse on conductor 200 is applied to reset inputs R of flip-flops 202 and 204. Flip-flops 202 and 204 are of any convenient and conventional type which are triggered (i.e. set or reset) by a negative going signal. The flip-flops provide a low signal at the reset output R′ and a high signal at the set output S′ when in a reset condition, and a high signal at the reset output R′ and a low signal at the set output S′ when in a set condition. All of the flip-flops shown in FIGURE 9 have the same characteristics.

Flip-flops 202 and 204 have their reset output R′ connected by conductors 206 and 208, respectively, to the input of a NAND gate 210. Gate 210 may be of any convenient or conventional type. The logic of the NAND gate is such that when two low signals, or a low and a high signal are applied at its input a high signal is provided at its output; and only when two (or all) the signals applied at its input are high is a low signal provided at the output. NAND gate 210, and the other NAND gates shown in the FIGURE 9 are all of the same logic type.

Since both flip-flops 202 and 204 are in a reset condition, a pair of low signals are applied (via conductor 206 and 208) to the inputs of gate 210 qualifying the gate to provide a high signal at its output on a conductor 212. Conductor 212 is connected to an input of a NAND gate 214 and the high signal partially qualifies the gate 214. Conductor 212 is also connected to the reset input R of a flip-flop 216. As noted above, the flip-flops change state by a negative going signal, thus the instant positive going signal on conductor 212 does not change the state of flip-flop 216.

The set outputs S′ of flip-flops 202 and 204 are connected through conductors 226 and 228, respectively, to a NOR gate 230. NOR gate 230 is of any convenient or conventional type. The logic of this gate is such that when the signals applied at its input are both high, a low signal is provided at its output; when the signals applied at its input are both low, or one low and one high, the output is high.

Since both of the signals now applied to the NOR gate 230 are high, its output is low. Output from NOR gate 230 is applied by conductor 232 to the NAND gate 214. The low signal disqualifies gate 214. Gate 214 provides an output on conductor 234 which is connected to the set input S of flip-flop 216. The instant signal from NAND gate 214 is high and does not change the state of flip-flop 216.

After the arm pulse there comes a pulse from one of the phototransistors 20A or 20B on conductor 201A or 201B, respectively. For example, let us assume that the A pulse from phototransistor 20A on conductor 201A occurs next. This A pulse is applied to the set input S of flip-flop 204. Thus, flip-flop 204 changes state rendering a low signal on conductor 228 and a high signal on conductor 208. The high signal is applied to NAND gate 210 partially qualifying the same, but the gate 210 is held disqualified by the low signal on conductor 206 from reset flip-flop 202, and a high signal is maintained at gate 210 at its output on conductor 212.

The low signal on conductor 228 is applied to NOR gate 230 changing its state and providing a high signal at its output on the conductor 232. A pair of high signals are now presented to NAND gate 214 qualifying it and providing a low signal on conductor 234. The high to low signal on conductor 234 triggers flip-flop 216, setting it, and providing a high signal on the reset output R′. This high signal is applied through conductor 238 to a NAND gate 240 partially qualifying said gate. A second input 239 to gate 240 comes from a high frequency oscillator 242. The high signal on conductor 238 opens gate 240 enabling the high frequency pulses, or alternations, from oscillator 242 through the gate 240 into a counter readout 244. Thus, upon the occurrence of the A pulse, the counter 244 begins counting.

Subsequently, when the B pulse occurs, this pulse on conductor 201B sets flip-flop 202 rendering at set output S' and on conductor 226 a low signal, and rendering at the reset output R' and on conductor 206 a high signal. This, in turn, enables NAND gate 210 to provide a low signal on output conductor 212. The high to low signal on conductor 212 resets flip-flop 216 rendering at its reset output R' a low signal and a low signal on conductor 238 to disqualify, or close, NAND gate 240 blocking subsequent pulses from oscillator 242 from passing therethrough to the counter 244. Thus, counter 244 has recorded a group of pulses that have occurred during the elapse time between the occurrence of the A and B pulses.

If the B pulse had preceded the A pulse, the operation of the circuit would be identical except that the order of flip-flops 202 and 204 changing states, would have been reversed; the gates 210, 230, 214, 240 and flip-flop 216 behaving in an identical manner.

The frequency of the clock pulses or pulses from the oscillator determines the number of pulses or unit counts that are stored in the counter readout per unit of error which is time between pulses A and B.

To determine which of the two pulses A or B occurs first, the following blocks in the FIGURE 9 are used. A pair of NAND gates 250 and 252 both receive a signal from the reset R' output of flip-flop 216 via conductors 238 and 253.

Gate 250 also receives an input from the reset R' output of gate 204 via conductor 208, and from the set S' output from flip-flop 202 via conductor 226. Gate 252 also receives at its input the set S' output of flip-flop 204 via conductor 228 and the reset output from flip-flop 202 via conductor 206.

Upon the occurrence of the arm pulse, there is applied to the inputs of the gates 250 and 252 a low signal on conductor 253 from the reset output 238 of flip-flop 216; and a low signal on conductors 206 and 208 from the reset outputs R' of flip-flops 202 and 204. The set S' outputs of both flip-flops 202 and 204 are high, so that a high signal is also applied to both NAND gates 250 and 252. This renders the gates in a "disabled state" and at the outputs of both gates 250 and 252, there is a high signal. The output of gate 250 is connected via conductor 254 to the set S input of a flip-flop 260. The output of gate 252 is connected via a conductor 262 to the reset R input of a flip-flop 260. Thus, after the occurrence of the arm pulse prior to the A or B pulse, a positive signal is applied to both the set and reset inputs of flip-flop 260. Upon the first occurrence of the A or B pulse, for example, let us assume it is the A pulse, flip-flop 204 changes state and a high signal is applied via conductor 208 to gate 250 (to further disqualify the gate). However, a low signal is applied from the set output S' of flip-flop 204 (via conductor 228) to gate 252 which is now qualified. The output of gate 252 changes from a high to a low. This negative going signal is applied via conductor 262 to the reset input R of the flip-flop 260 to change the flip-flop's state and provide a low signal on conductor 261 from the reset output R' of flip-flop 260. A low signal on conductor 261 from the reset output R' of flip-flop 260 indicates that the A signal precedes the B signal. As will become apparent later, a high signal on the output conductor 261 of flip-flop 260 indicates that the B pulse precedes the A pulse.

Returning to our example, upon the subsequent occurrence of the B pulse, flip-flop 202 changes state providing a high signal on conductor 206 to disqualify gate 252 and rendering its output positive but as noted above, a positive going signal does not trigger or change the state of a flip-flop. The low signal provided at the set S' output of flip-flop 202 partially qualifies NAND gate 250. This gate is disqualified by a high signal from the reset R' output of flip-flop 204.

The operation of the circuit with the B pulse preceding the A pulse may be traced, and it will be apparent that, upon the B pulse preceding the A pulse, flip-flop 260 is initially set and stays in a set condition thus providing a high signal at the reset R' output 261 of flip-flop 260.

The output 261 leads to a suitable error polarity indicator 262 so that there is indicated to the operator a low or high signal on the output 261 and thereby whether the A signal precedes the B signal or the B signal precedes to A signal and thereby the direction of tilt off a perpendicular to the sun's axis.

In summary, the circuit represented by the block diagram, shown in FIGURE 9, receives an arm pulse, an A pulse, and a B pulse, and provides in a counter 244 a count proportional to the time difference between the A and the B pulse which is proportional to deviation from the sun center, and provides at the output 261 of flip-flop 260 a high signal when the B pulse precedes the A pulse and a low signal when the A pulse precedes the B pulse so that the error polarity indicator 262 may indicate the direction of tilt off a perpendicular to the sun's axis.

OFF-AXIS-ADAPTER

In addition to the error readout control circuit of FIGURE 9, there may also be provided an off-axis-adapter 300, shown in FIGURE 10, and including essentially an optical gimbal designed to fit over the end of the mounting flange 12, as shown in FIGURE 10.

The adapter 300 incorporates a pair of optical wedges 302 and 304 driven separately by digital stepper motors 306 and 308 through a sleeve 310 rotatably mounted in bearings 312 and a sleeve 314 rotatably mounted on bearings 316. Optical encoder discs 320 and 322 are operatively connected through the sleeves 310 and 314, respectively, to each wedge 302 and 304. The encoder discs 320 and 322 are each arranged to cooperate with suitable encoder disc readout devices 325 and 326 of a conventional type arranged to effect signals for providing angle position readout.

A digital servo or other suitable means may be used to control each of the motors 306 and 308 to position each wedge 302 and 304 so that incoming light is deviated for off-axis pointing of the sun sensor on a space craft on which the same may be mounted. The foregoing may produce an error signal which may be used by the control system for repositioning the body mounted sensor to obtain the desired off-axis pointing.

Thus command signals controlling the motors 306 and 308 have stepped the wedges 302 and 304 to selected positions while the encoding discs 320 and 322 in cooperation with the encoder disc readout devices 325 and 326 may effect control signals to readout the adjusted wedge positions. When the discs 320 and 322 have stepped to the commanded position, the difference between the digital command commanded and that produced by the offset pointer is zero and the stepping ceases.

In order to ease the requirements for accurately positioning the wedges 302 and 304, an alternate optical path is provided for the incoming light which bypasses the wedges 302 and 304 reverting the sun sensor to normal operation as heretofore described with reference to FIGURE 1, wherein each of the photodetectors 20A–20D receives light from the sun. Therefore, when no deviation is required, a shutter 330 is provided which may be rotated about a pivot 331 one hundred and eighty degrees (180°) from the position shown in FIGURE 10 so as to position an opening therein 332 in alignment with openings 334 and 336 in the optical wedges 302 and 304. Undeviated light rays from the sun may then enter a main opening 340 in the adapter and pass through the opening 332, a suitable light filter or transparent disc 341 and in turn through the openings 334 and 336 so as to be directed thereby onto a beam splitting tetrahedron 342.

The reflected light rays are then directed towards four front surfaced half silvered mirrors, three of which are shown in FIGURE 10 and indicated by the numerals 344A, 344B, and 344C, and which are arranged in a tetrahedral fashion and geometrically arranged to operate in conjunction with the beam splitter 342 to cause the light rays to enter through the apertures 14A, 14B, 14C, and 14D whereupon the sun sensor device 10 will operate as herefore described with reference to FIGURE 1.

When deviation in the light rays is desired, the shutter 330 may be rotated to the position shown in FIGURE 10 in which position an opaque center portion 352 will occult the openings 334 and 336 while an annular transparent portion 354 permits the light rays entering through the main opening 340 to be directed through the light filter or transparent disc 341 and then through the optical wedges 302 and 304 so as to effect a deviation in the light rays which is a function of the angular position of each of the optical wedges 302 and 304.

The deviated light rays from the sun then pass through the half silvered mirrors 344 and enter through the apertures 14A, 14B, 14C, and 14D into the sun sensor device 10.

The angular position of the shutter 330 about the pivot 331 may be effected by suitable operator-operative servomechanism means not shown.

OPERATION OF THE SUN SENSOR

The fine sun sensor of FIGURES 1 to 9, as heretofore described, is arranged to have the following capabilities:

(1) It may provide error signals to an outer space operated vehicle which will indicate apparent center of the sun to within a ±1.0 second of arc.

(2) Further, the off-axis-adapter of FIGURE 10 provides a means for off-axis pointing and scanning while degrading its accuracy to ±2.5 seconds of arc for a 40 arc minute field.

(3) Accuracy of the instrument will not be effected by change in distance of the outer space vehicle to the sun for the instrument is inherently stable, and there is no cross coupling to effect gain or accuracy on each channel.

The sun sensor device of FIGURE 1 may be mounted on the outer space vehicle so that when used with the off-axis-adapter of FIGURE 10, the light rays from the sun may pass therethrough, as heretofore explained and through the apertures 14 of the cap 12 of FIGURE 1, or when the off-axis adapter is not used, the light rays from the sun are passed straight through the apertures 14. The light rays in turn impinge on the lenses 22A–22B and 22C–22D carried by the oscillating disc 24.

As the lenses 22A–22B and the lenses 22C–22D move with the disc 24, the images of the sun formed by them oscillate in the focal plane. Each image, during its motion, crosses a corresponding detector slit, shown schematically in FIGURE 7, to cause a corresponding phototransistor 20A–20B and 20C–20D to generate an electrical output, as shown schematically in FIGURE 7. Since the lenses 22A–22D are on the same vehicle plane on the disc 24, their motions are synchronized.

The drawing of FIGURE 5 shows the relative position of the images and the output from the detectors for some characteristic instances under operating conditions in which the sun is "on-axis." FIGURE 6 depicts "off-axis" image condition. The off-axis error proportional to $\Delta p$ may be read out in many ways. One error readout control circuit for effecting operation has been heretofore described with reference to FIGURE 9. In the arrangement of FIGURE 9, three output pulses are used from the sun sensor device of FIGURES 1 through 4 to initiate and control the digital counting of the control circuit of FIGURE 9 as a function of the light sensor error. Thus an arm pulse is generated by the tachometer 102 of FIGURE 4 at the peak amplitude of the oscillating chopper disc 24 and applied through conductor 200 to the error readout control circuit of FIGURE 9. This pulse acts as a synchronizing reference for maintaining a proper sequence of the following efforts.

Output from the two light sensitive pickoffs 20A–20B or 20C–20D, as the case may be, may be applied through the conductors 201A and 201B to the flip-flops 202 and 204 of FIGURE 9 to provide a pair of phase displaced pulses upon the sun sensor being in the off-axis position of FIGURE 6, which pair of phase displaced pulses are measured to determine displacement error, as heretofore explained with reference to FIGURE 9.

Thus, as explained with reference to FIGURE 9, the number of clock pulses in the control readout 244 is proportional to the time difference between corresponding reading avenues of the light sensor pulses. At zero error pulses from A and B, light sensors will be coincident as shown in FIGURE 5 while noncoincidence of sensor pulses as shown in FIGURE 6 will cause the control readout 244 to come into operation so that normal counts are obtained.

The clock pulse generator or oscillator 242 may operate at a predetermined frequency at 1.6+ megacycles per second, which frequency may be chosen to make D/A conversion easy while producing the minimum bit required. The oscillation of the disc 24 may be at a frequency of 35 c.p.s. The sun's disc is swept across an opening equal in width to the diameter of the image.

Figure 7:
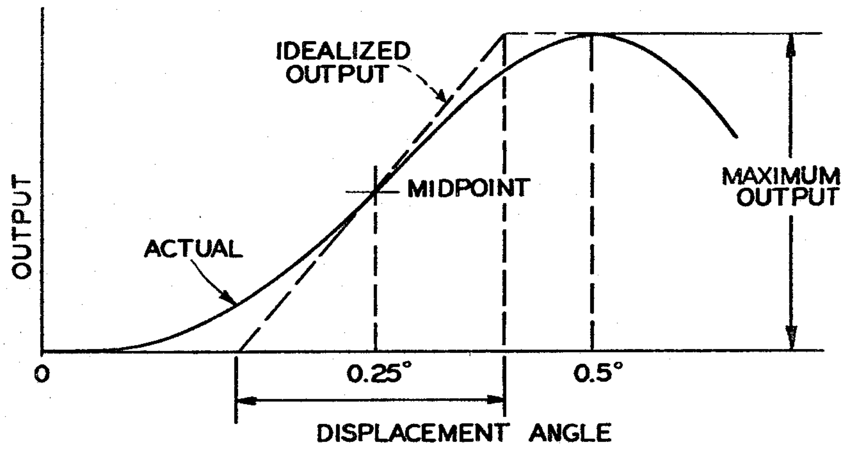
FIGURE 7 is a graphical illustration of the electrical output signal effected from the sun sensor device as the sun image crosses the aperture slit above the phototransistor to effect such signal in accordance therewith.
Figure 8:
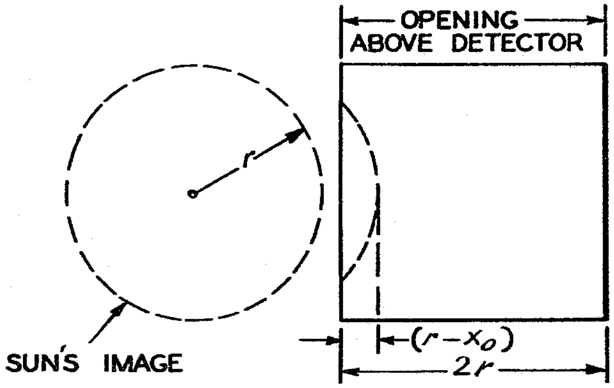
FIGURE 8 is a schematic illustration showing the image of the sun in operative relation to the aperture slit of the phototransistor.

FIGURE 7 shows the output wave shape as well as an idealized output which is assumed proportional to the incident light flux on the detector while FIGURE 8 shows schematically the passage of the sun's image relative to the aperture slot 21.

Since the sweep angle is small, the output from the forward transistor may be linearized so as to provide the time necessary to resolve the 1 arc second. The counter read 244 must be capable of discerning 1 second of arc out of .41° or 1475 arc seconds. Since the sensor time output is twice the angular error, the counter must be able to discern 1 part in 738.

As the earth moves around the sun, the image size will vary. The sun sensor's operation is such that it is not sensitive to image size variation.

The scan of the sun sensor may be sinusoidal with respect to time. By putting bias or offset command bits into the command data storage subsystem, the output signal to the control system shall indicate a nonnull condition when the sensor is nulled. A control system for an outer space vehicle when operated thereby will then offset the vehicle until the output from the command data storage subsystem is zero, which can only occur when the input to the control system from the sun sensor is equal and opposite to the command bits.

Although only one embodiment of the invention has been illustrated and described, various changes in the form and relative arrangement of the parts which will now appear to those skilled in the art may be made without departing from the scope of the invention. Reference is, therefore, to be had to the appended claims for a definition of the limits of the invention.

What is claimed is:

1. A sun sensor device comprising a casing having a cap at one end, said cap having four apertures spaced ninety degrees apart to admit incident light rays from the sun, a cap at the other end of the casing, four photodetector elements carried by the cap at the other end of the casing and spaced ninety degrees apart, each of said photodetector elements having an electrical output, aperture slits contained in said photodetector elements and arranged therein so that said photodetector elements will respond to light rays impinging thereon through said slits, an oscillatable disc, torsion members to coaxially mount said oscillatable disc in the casing intermediate the caps at the opposite ends of the casing, said oscillatable disc including light passage means mounted ninety degrees apart and arranged so as to be angularly aligned with the apertures in the one cap and the aperture slits in the photodetector elements on the other cap, and said torsion members affixed at opposite ends to the two caps for mounting the disc intermediate said caps for oscillating motion.

2. A sun sensor device comprising a casing having a cap at one end, said cap having four apertures spaced ninety degrees apart to admit incident light rays from the sun, a cap at the other end of the casing, four photodetector elements carried by the cap at the other end of the casing and spaced ninety degrees apart, each of said photodetector elements having an electrical output, aperture slits contained in said photodetector elements and arranged therein so that said photodetector elements will respond to light rays impinging thereon through said slits, an oscillatable disc, torsion members to coaxially mount said oscillatable disc in the casing intermediate the caps at the opposite ends of the casing, said oscillatable disc including four lens elements mounted ninety degrees apart and arranged so as to be angularly aligned with the apertures in the one cap and the aperture slits in the photodetector elements on the other cap, said torsion member affixed at opposite ends to the two caps for mounting the disc intermediate said caps for oscillatable motion, and motor means for oscillating the disc in predetermined angular relation to the apertures in the one cap and the aperture slits in the other cap to control the electrical outputs of said photodetector elements.

3. A sun sensor device comprising a casing having a plurality of apertures therein at one end thereof to admit incident light rays from the sun, corresponding photodetectors carried by another end of the casing, corresponding slits contained in said photodetectors so that said photodetectors will respond to light rays impinging thereon through said corresponding slits, an opaque oscillatable disc, torsion members to coaxially mount said disc in the casing and intermediate said ends of the casing, said oscillatable disc including corresponding light passage means angularly aligned with the apertures and the slits, and said torsion members supporting the disc within the casing intermediate said ends thereof for oscillating motion.

4. A sun sensor device comprising a casing having a plurality of apertures therein at one end thereof to admit incident light rays from the sun, corresponding photodetectors carried by another end of the casing, corresponding slits contained in said photodetectors so that said photodetectors will respond to light rays impinging thereon through said slits, an opaque oscillatable disc, torsion members to coaxially mount said disc oscillatably in the casing and intermediate the opposite ends of the casing, said oscillatable disc including corresponding light passage means angularly aligned with the apertures and slits, said torsion members supporting the disc within the casing intermediate said ends thereof for oscillating motion, and motor means for oscillating the disc in predetermined angular relation to the apertures and the slits so as to control electrical outputs from said photodetectors varying with the light rays impinging thereon through said slits.

5. A sun sensor device comprising a casing having a plurality of apertures therein at one end thereof to admit incident light rays from the sun, corresponding photodetectors carried by another end of the casing, corresponding slits contained in said photodetectors so that said photodetectors will respond to light rays impinging thereon though said slits, an opaque oscillatable disc, torsion members to coaxially mount said disc in the casing and intermediate said ends of the casing, said oscillatable disc including corresponding lens means angularly aligned with the apertures, and the slits, said torsion members supporting the disc within the casing intermediate said ends thereof for oscillating motion, and motor means for oscillating the disc so as to control electrical outputs from said photodetectors varying with the light rays impinging thereon through said slits upon a deviation error in an axis of the sun.

References Cited by the Examiner

UNITED STATES PATENTS

| | | | |
|---|---|---|---|
| 2,931,910 | 4/1960 | Ostergren et al. ----- | 250—203 |
| 3,087,373 | 4/1963 | Poor et al. ------------- | 88—1 |

RALPH G. NILSON, *Primary Examiner.*

WALTER STOLWEIN, *Examiner.*

M. A. LEAVITT, *Assistant Examiner.*